US012240535B2

(12) United States Patent
Magee

(10) Patent No.: US 12,240,535 B2
(45) Date of Patent: Mar. 4, 2025

(54) HEADWIND/CROSSWIND AIR JET SHIELD

(71) Applicant: Florida A&M University, Tallahassee, FL (US)

(72) Inventor: Charles Magee, Cairo, GA (US)

(73) Assignee: FLORIDA A&M UNIVERSITY, Tallahassee, FL (US)

( * ) Notice: Subject to any disclaimer, the term of this patent is extended or adjusted under 35 U.S.C. 154(b) by 311 days.

(21) Appl. No.: 18/049,792

(22) Filed: Oct. 26, 2022

(65) Prior Publication Data

US 2023/0211834 A1 Jul. 6, 2023

Related U.S. Application Data

(60) Provisional application No. 63/295,583, filed on Dec. 31, 2021.

(51) Int. Cl.
*B62D 35/00* (2006.01)
(52) U.S. Cl.
CPC ......... *B62D 35/005* (2013.01); *B62D 35/008* (2013.01)
(58) Field of Classification Search
USPC ................................................ 296/91, 180.1
See application file for complete search history.

(56) References Cited

U.S. PATENT DOCUMENTS

| 2,792,254 | A | * | 5/1957 | Hagglund | B60J 1/2005 |
| | | | | | 180/68.6 |
| 7,232,175 | B2 | * | 6/2007 | Yuan | B60J 1/20 |
| | | | | | 296/180.1 |
| 7,665,798 | B2 | * | 2/2010 | Hsia | B62D 35/007 |
| | | | | | 114/271 |

\* cited by examiner

*Primary Examiner* — Joseph D. Pape
(74) *Attorney, Agent, or Firm* — Greenberg Traurig, P.A.; Allen Kim

(57) ABSTRACT

Various embodiments are directed to an air jet shield. The air jet shield may include a support frame configured to attach to a vehicle utilizing a set of security straps. Sets of V-shaped and concave air ducts may be horizontally and vertically coupled to the support frame, respectively. Each of the air ducts may have a decreasing cross-sectional area and include (i) an inlet that receives air from a surrounding environment during a travel of the vehicle into a headwind or crosswind and (ii) an outlet that dispenses the air received from the inlet as a free air jet. Upon entering a headwind or crosswind, the free air jet creates a wind shear causing rotation at an increased velocity. Within the free air jet and surrounding the vehicle, static air pressure and wind velocity is decreased, thereby causing a reduction in aerodynamic drag during travel.

20 Claims, 4 Drawing Sheets

HEADWIND/CROSSWIND AIR JET SHIELD

CROSS REFERENCE TO RELATED APPLICATION

This application claims the benefit of U.S. Provisional Application No. 63/295,583, filed Dec. 31, 2021, the disclosure of which is incorporated, in its entirety, by this reference.

BACKGROUND

Periods of economic inflation often result in rising fuel prices on a global scale. For example, during periods of inflation, gasoline prices in some regions of the United States of America may increase significantly (e.g., over six dollars per gallon for commercial and passenger vehicles). As a result, transportation industries such as airlines, trucking, and busing companies often seek to implement fuel saving methods to save costs. While one method that is often utilized to save fuel is to reduce consumption in vehicles (e.g., cars, trucks, airplanes, buses, boats, etc.), efforts to reduce fuel consumption may often be hindered when vehicles are subjected to a headwind and/or crosswind when in motion. In particular, when moving vehicles encounter headwinds and/or crosswinds, fuel consumption actually increases due to the increased power utilization required to overcome drag (e.g., resistance) created by wind, thereby significantly reducing the efficiency of this fuel saving method.

SUMMARY

As will be described in greater detail below, the instant disclosure generally relates to a headwind/crosswind air jet shield. In one example, an air jet shield may include a support frame having a generally curved body configured to match a front end of a passenger vehicle. The air jet shield may further include a set of security straps coupled to the support frame. The security straps may be configured to attach the support frame to the passenger vehicle. The air jet shield may further include multiple sets of air ducts coupled to the support frame. The air ducts may include a set of V-shaped air ducts horizontally coupled to the support frame and a set of concave air ducts vertically attached to the support frame. Each of the air ducts may be constructed so that they have a decreasing cross-sectional area. Additionally, each of the air ducts may include (i) an inlet that receives air from a surrounding environment during a travel of the passenger vehicle into a headwind or a crosswind and (ii) an outlet forming a rectangular shape that dispenses the air received from the inlet as a free air jet. The outlet may project the free air jet into the headwind or crosswind where, upon the free air jet entering the headwind or crosswind, a wind shear is created causing the free air jet to rotate at an increased velocity relative to a velocity of the air received from the inlet. Furthermore, a static air pressure and a wind velocity in a region of space within the rotating free air jet and surrounding the passenger vehicle is decreased relative to a static pressure of the air received from the inlet and the wind velocity causing a reduction in aerodynamic drag for the passenger vehicle.

In some examples, the reduction in the aerodynamic drag reduces a fuel consumption of the passenger vehicle during travel. In some examples, the region of space within the rotating free air jet and surrounding the passenger vehicle includes (i.e., forms) an air deflection perimeter.

In some examples, the air jet shield may additionally include a set of strap spools for storing and/or dispensing the security straps. In some examples, each of the set of strap spools may include a handle for adjusting a length of the security straps. In some examples, the set of strap spools (absent the handle) and the security straps may be stored in a cavity forming a portion of, or coupled to, the support frame. In some examples, one or more of the security straps may be configured to attach to a bumper, a hood, and/or a vehicle frame of the passenger vehicle.

In some examples, the air jet shield may be a component of a system including a vehicle. In some examples, the air jet shield may be integrated into the vehicle. Additionally or alternatively, the air jet shield may be coupled or integrated with a structure (e.g., a building, animal corral, etc.). Additionally or alternatively, the air jet shield may be coupled to a land area (e.g., fields, tree orchards, etc.).

Features from any of the above-mentioned embodiments may be used in combination with one another in accordance with the general principles described herein. These and other embodiments, features, and advantages will be more fully understood upon reading the following detailed description in conjunction with the accompanying drawings and claims.

DETAILED DESCRIPTION

Figure 1:
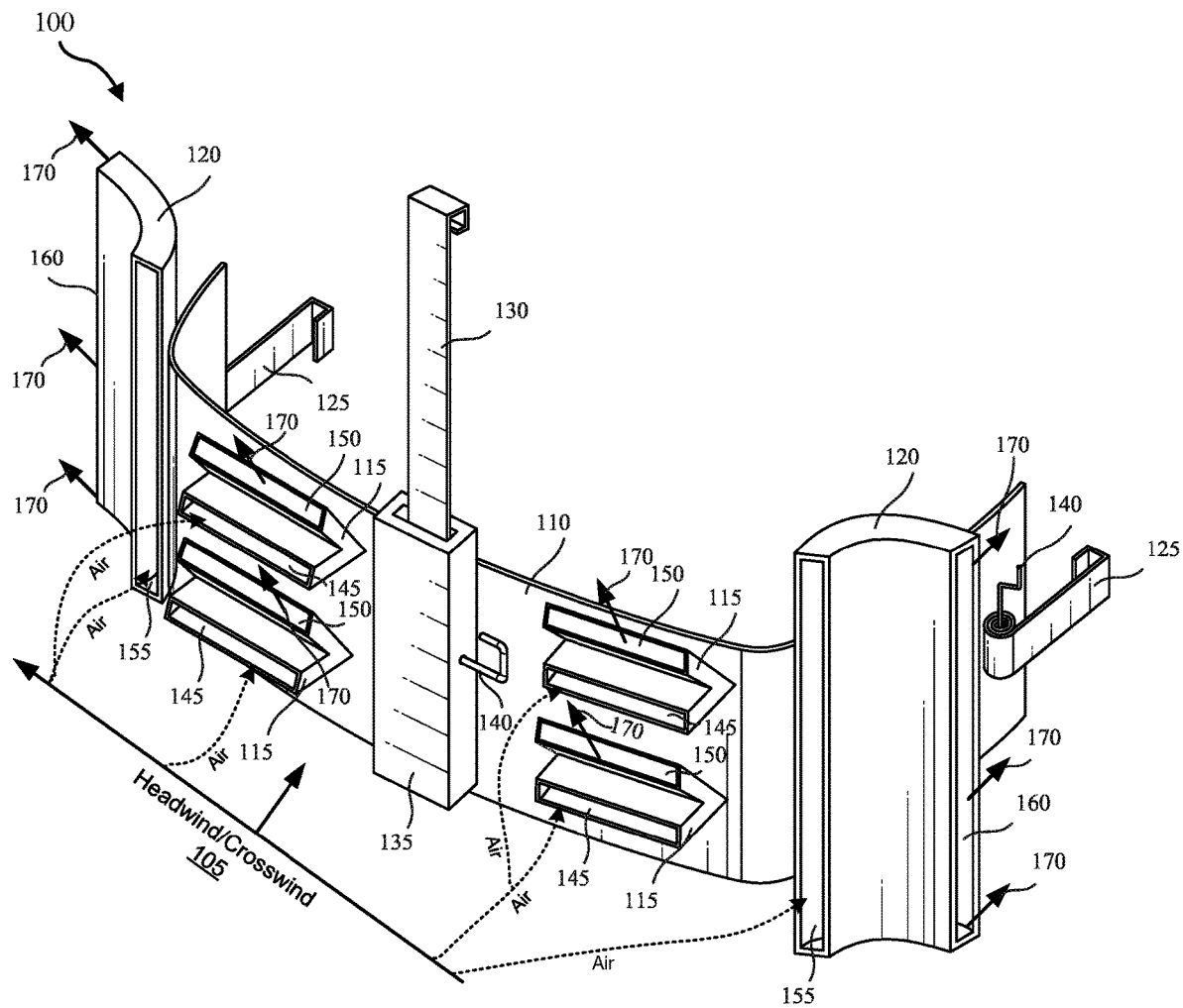
FIG. 1 illustrates a perspective view of a headwind/crosswind air jet shield, according to an example embodiment.

The present disclosure is generally directed to a headwind/crosswind air jet shield. As will described in greater detail below, the various embodiments described herein may augment a vehicle with an air jet shield for creating a reduction in drag that reduces fuel consumption, without changing the vehicle's shape and surface texture. In some examples, the air jet shield may be configured to project a free air jet into a headwind and/or crosswind to create shear and rotation in oncoming (e.g., approaching) air.

As defined herein, a "free air jet" is a stream of air moving at a different velocity than a velocity of the surrounding air. In some examples, the free air jet projected by the air jet shield may create rotation in oncoming air (i.e., a headwind and/or crosswind) in front of or to the side of a vehicle, thereby causing an increase in velocity pressure and a corresponding decrease in static pressure and air velocity surrounding the vehicle based on Bernoulli's equation in fluid dynamics which states that an increase in the speed of a fluid occurs simultaneously with a decrease in static pressure or a decrease in the fluid's potential energy. For example, in a hurricane, the air pressure and wind velocity in the "eye" is very low as compared to the air pressure and wind velocity of the surrounding storm (i.e., the "eyewall"). The decreased static pressure and air velocity surrounding the vehicle resulting from utilization of the air jet shield causes a reduction in drag and, consequently, a reduction in vehicle fuel consumption. For example, in passenger cars, a 10% reduction in aerodynamic drag may result in a 5% reduction in fuel consumption (i.e., a 5% fuel savings) for highway driving and a 2% reduction in fuel consumption (i.e., a 2% fuel savings) for city driving. Thus, in some embodiments and based on the aforementioned data, the air jet shield disclosed herein may be configured to reduce aerodynamic drag by 80% (and thereby resulting in a fuel savings of 40% for highway driving and 16% for city driving).

The term "vehicle" as used herein, generally refers to any machine utilized for transporting people or cargo. Example vehicles may include, without limitation, motor vehicles (e.g., automobiles, motorcycles, trucks, buses, etc.), railed vehicles, watercraft, amphibious vehicles, aircraft and/or spacecraft.

The term "drag" as used herein, is the amount of frictional force on any moving object in still air. For example, when a vehicle is moving, trillions of air molecules may be situated in front of the vehicle. As the vehicle approaches these air molecules, they begin to compress thereby raising the air pressure in front of the vehicle. Drag may further be defined as the aerodynamic force that opposes a vehicle's motion through air. For drag to be generated, a vehicle must be in contact with a fluid (i.e., a liquid or gas). In particular, drag may be generated by a difference in velocity between a vehicle and a fluid. Moreover, for drag to be generated, a vehicle must be in contact with a fluid (e.g., liquid or gas). Drag may also be generated by a difference in velocity between a vehicle and a fluid. Furthermore, there is no distinction as to whether a vehicle moves through a static (e.g., stationary) fluid or whether a fluid moves past a vehicle. Thus, without fluid or motion, no drag can be generated.

The various embodiments of the headwind/crosswind air jet shield disclosed herein may be utilized in a variety of use cases including on automobiles, airplanes, boats, motorcycles, or any vehicle subjected to drag forces from air or water. Additionally or alternatively, the air jet shield may be utilized to form an air deflection perimeter around buildings, structures, tree orchards, fields, animal corrals, and/or areas or locations where a hurricane-eye effect is needed to provide an environment with low air pressure and wind velocity.

Various advantages may be realized by utilizing the headwind/crosswind air jet shield disclosed herein. These advantages include, without limitation, (1) reducing wind or water drag forces on a vehicle moving in a fluid, (2) enabling the creation of air jets to deflect high winds of hurricanes, tornadoes, and tropical storms, (3) enabling the creation of a hurricane-eye around structures or areas that need a zone of low pressure and wind velocity, (4) compatibility and use on a variety of vehicles such as cars, trucks, airplanes, buses, motorcycles, and boats, (5) the ability to be attached to or incorporated into the design of any vehicle or structure subjected to high winds, (6) enabling increased safety of vehicles being driven under windy conditions, (7) reducing vehicle fuel consumption, and (8) the ability to be easily manufactured and installed for a variety of use cases.

Embodiments of the disclosure now will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

FIG. 1 illustrates a perspective view of a headwind/crosswind air jet shield (hereinafter referred to as "air jet shield 100"), according to an example embodiment. In some examples, air jet shield 100 may be constructed from a number of components including a support frame 110, upon which may be mounted, horizontally mounted V-shaped air ducts 115, vertical concave air ducts 120, and security straps 125 and 130. In some examples, support frame 110 may be constructed to have a generally curved shape matching the shape of the front of a vehicle (e.g., a passenger vehicle such as an automobile).

In some examples, V-shaped air ducts 115 and concave air ducts 120 may be constructed to have inlets 145 (with respect to V-shaped air ducts 115) and inlets 155 (with respect to concave air ducts 120) for receiving air (e.g., air from headwind/crosswind 105) from the surrounding environment (e.g., when air jet shield 100 is attached to a moving vehicle travelling on a roadway). In some examples, V-shaped air ducts 115 and concave air ducts 120 may also be constructed to have outlets 150 (with respect to V-shaped air ducts 115) and outlets 160 (with respect to concave air ducts 120) for dispensing air (e.g., as free air jets 170) received from inlets 145 and 155, respectively.

Figure 4:
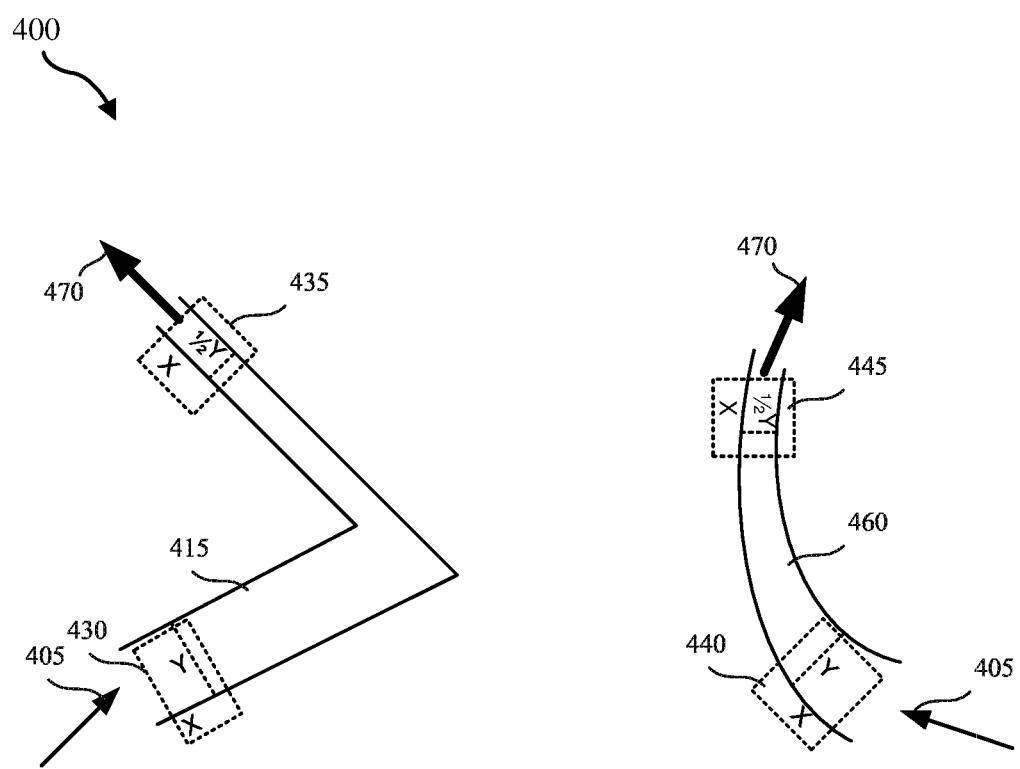
FIG. 4 illustrates V-shaped and concave air ducts utilized by the headwind/crosswind air jet shield shown in FIGS. 1-3, according to an example embodiment.

In some examples, V-shaped air ducts 115 and concave air ducts 120 may be constructed such that inlets 145 are larger than inlets 155. In some examples, outlets 150 and outlets 160 may have a generally rectangular shape. In one example, V-shaped air ducts 115 and concave air ducts 120 may be constructed such that their cross-sectional area gradually decreases 50% (i.e., the cross-sectional area is halved). In some embodiments, during use of air jet shield 100, air may enter inlets 145 and 155 and outlets 150 and 160 as free air jets 170 travelling at a very high velocity. In some examples, a velocity profile of free air jets 170 may be determined based on characteristics of outlets 150 and 160 (e.g., outlets 150 and 160 having a rectangular shape) and the velocity of free air jets 170 may be calculated utilizing the Bernoulli equation for conservation of energy. For example, when air flows at a velocity of 5 m/s through a V-shaped air duct 115 and/or a concave air duct 120 where the cross-sectional area gradually changes from 0.2 m$^2$ to 0.1 m$^2$ (i.e., the cross-sectional area is reduced in half), continuity considerations necessitate that the air velocity doubles (i.e., increases from 5 m/s to 10 m/s). For example, FIG. 4 illustrates a set of ducts 400 including a V-shaped air duct 415 and a concave air duct 460 each having a decreasing cross-sectional area. Thus, area 430 determined from length "X" and width "Y" of V-shaped air duct 415 decreases to area 435 determined from length "Y" and width "1/2Y". Similarly, area 440 determined from length "X" and "width "Y" of concave air duct 460 decreases to area 445 determined from length "X" and width "1/2Y". As a result of the decreasing area, a velocity of free air jets 470 exiting V-shaped air duct 415 and concave air duct 460 is increased relative to a velocity of incoming air 405.

In some embodiments, upon leaving the outlets 150 and 160, free air jets 170 may be projected a distance (e.g., several meters) into headwind/crosswind 105. Upon free air jets 170 entering into headwind/crosswind 105, shear between free air jets 170 and headwind/crosswind 105 may create rotations (i.e., rotating air as a result of the intensity of the shear) having a very high velocity. As a result of energy conservation considerations (due to the Bernoulli equation), the velocity pressure of the rotating air will increase and static pressure in the region surrounding a vehicle (or other object or location) utilizing air jet shield 100 will decrease. Thus, when utilizing air jet shield 100 in headwind/crosswind 105, an environment is created similar to that of the eye of a hurricane where air pressure and wind velocity are low.

In some embodiments, security straps 125 and 130 may be utilized to attach air jet shield 100 to a vehicle. In some examples, security straps 125 may be attached to the sides of support frame 110 and utilized to attach air jet shield 100 to a vehicle frame. Additionally, security strap 130 may be utilized for attaching air jet shield 100 to the hood of a vehicle. In some embodiments, a bumper security strap (such as security strap 231 and as further described below in the description of FIG. 2) may also be utilized. In some examples, security strap 130 may be stored in a cavity 135 attached to or forming a portion of support frame 110. In some embodiments, each of security straps 125 and 130 may be adjustable to facilitate the attachment of air jet shield 100 to a variety of vehicles having different sizes. For example, in one embodiment, each of security straps 125 and 130 may be rolled onto a spool 140 (i.e., a strap spool) configured with a handle for adjusting a length of each of security straps 125 and 130. In one embodiment, a spool 140 for security strap 130 (which may be utilized to secure air jet shield 100 to a vehicle hood) may be integrated into cavity 135 with the attached handle being accessible for use outside of cavity 135.

Figure 2:
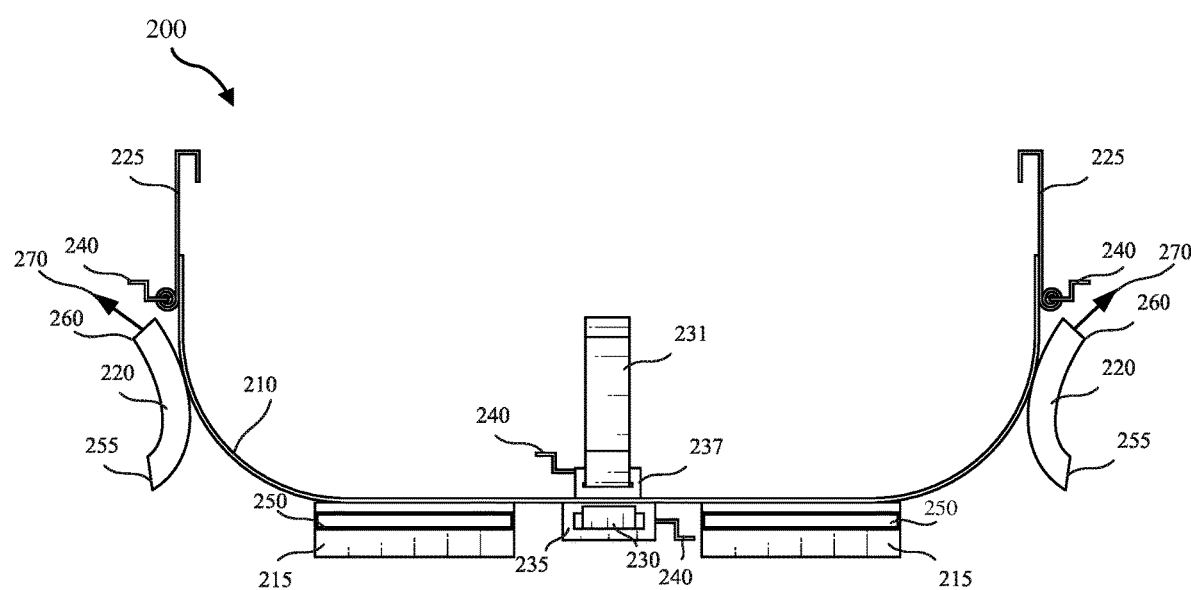
FIG. 2 illustrates a top view of a headwind/crosswind air jet shield, according to an example embodiment.

FIG. 2 is a diagram showing a top view of air jet shield 100 described in FIG. 1 (referred to herein as air jet shield 200). As shown in this figure, air jet shield 200 may include a support frame 210. Support frame 210 may include horizontally attached V-shaped air ducts 215, vertically attached concave air ducts 220, and security straps 225 and 230 (as described above in the description of FIG. 1 with respect to V-shaped air ducts 115, concave air ducts 120, and security straps 125 and 130) as well as security strap 231. As also described above in the description of FIG. 1, V-shaped air ducts 215 and concave air ducts 220 may each include inlets 250 and 255, respectively (for receiving air from the surrounding environment) and outlets 260 (shown for concave air ducts 220) for dispensing received air as free air jets 270 travelling at a very high velocity.

In some examples, security strap 231 attached to support frame 210 may be utilized for attaching air jet shield 200 to the bumper of a vehicle. In some embodiments, each of security straps 225, 230, and 231 may be rolled onto a spool 240 (i.e., a strap spool) configured with a handle for adjusting a length of each of security straps 225, 230, and 231. Additionally, each of security straps 231 and 230 may be integrated into cavities 235 and 237, respectively, with the attached handle being accessible for use outside of cavities 235 and 237.

Figure 3:
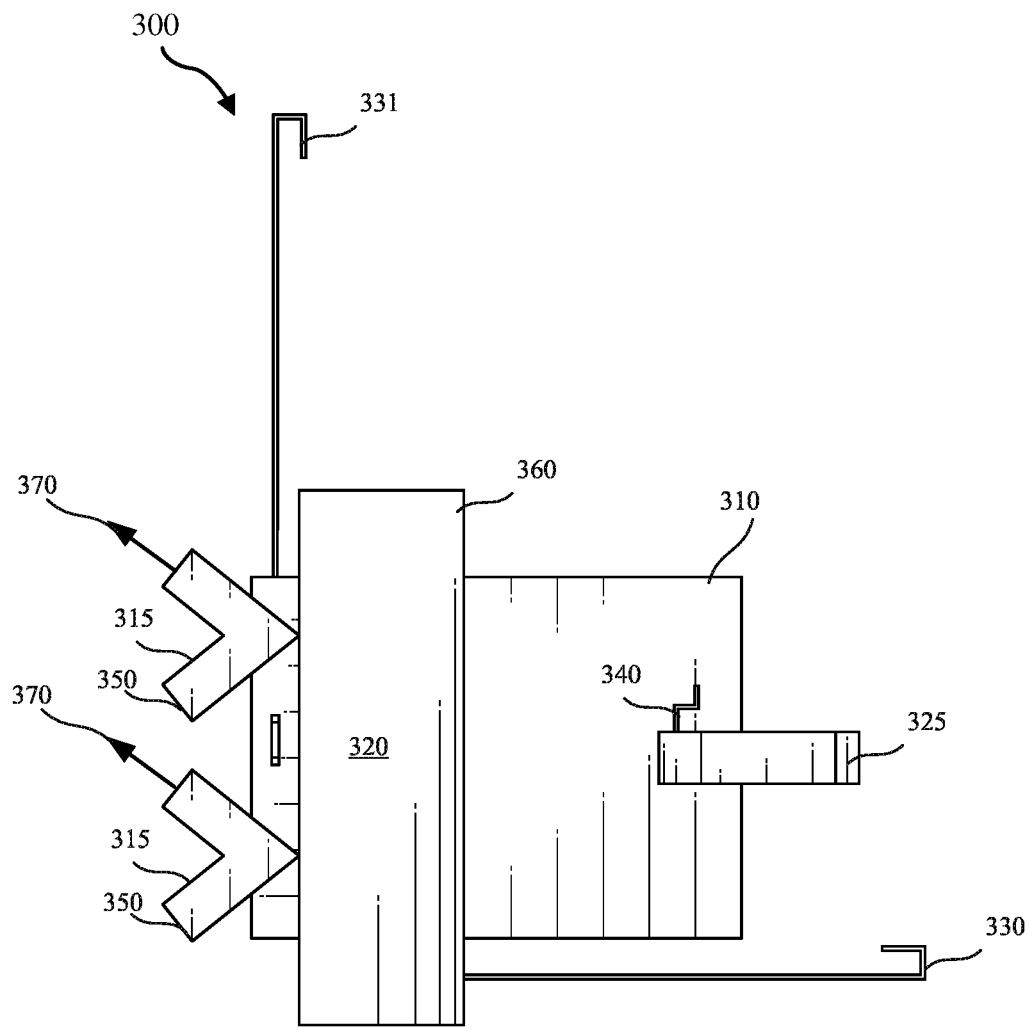
FIG. 3 illustrates a right end view of a headwind/crosswind air jet shield, according to an example embodiment.

FIG. 3 is a diagram showing a right end view of air jet shield 100 described in FIG. 1 (referred to herein as air jet shield 300). As shown in this figure, air jet shield 300 may include a support frame 310. Support frame 310 may include horizontally attached V-shaped air ducts 315, a vertically attached concave air duct 320, and security straps 325 (e.g., for attachment to a vehicle frame), 330 (e.g., for attachment to a vehicle hood) and 331 (e.g., for attachment to a vehicle bumper). V-shaped air ducts 315 may each include inlets 350 for receiving air from the surrounding environment and outlets for dispensing received air as free air jets 370 travelling at a very high velocity. Additionally, concave air duct 320 may include inlets and outlets (e.g., outlet 360) for receiving and dispensing air (as discussed above with respect to FIG. 1). In some examples, each security straps 325, 330, and 331 may be stored on spools (such as spool 340 for storing security strap 325) as discussed above with respect to FIGS. 1 and 2).

Any process parameters and sequence of steps described and/or illustrated herein are given by way of example only and can be varied as desired. For example, while steps illustrated and/or described herein may be shown or discussed in a particular order, these steps do not necessarily need to be performed in the order illustrated or discussed. Additionally, any exemplary methods described and/or illustrated herein may also omit one or more of steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. An air jet shield, comprising:
    a support frame comprising a generally curved body configured to match a front end of a passenger vehicle;
    a plurality of security straps coupled to the support frame, wherein the security straps are configured to attach the support frame to the passenger vehicle; and
    a plurality of air ducts coupled to the support frame, the plurality of air ducts comprising a set of V-shaped air ducts horizontally coupled to the support frame and a set of concave air ducts vertically attached to the support frame, each of the air ducts having a decreasing cross-sectional area, wherein each of the air ducts comprises:
        an inlet that receives air from a surrounding environment during a travel of the passenger vehicle into at least one of a headwind and a crosswind; and
        an outlet forming a rectangular shape that dispenses the air received from the inlet as a free air jet, wherein the outlet projects the free air jet into the at least one of the headwind and the crosswind, wherein upon the free air jet entering the at least one of the headwind and the crosswind, a wind shear is created causing the free air jet to rotate at an increased velocity relative to a velocity of the air received from the inlet, wherein a static air pressure and a wind velocity in a region of space within the rotating free air jet and surrounding the passenger vehicle is decreased relative to a static pressure of the air received from the inlet and the wind velocity causing a reduction in aerodynamic drag.

2. The air jet shield of claim 1, further comprising a set of strap spools for storing the plurality of the security straps.

3. The air jet shield of claim 1, wherein each of the set of strap spools comprises a handle for adjusting a length of the plurality of the security straps.

4. The air jet shield of claim 2, wherein the set of strap spools for storing the plurality of the security straps are stored in a cavity forming a portion of the support frame.

5. The air jet shield of claim 2, wherein the set of strap spools for storing the plurality of the security straps are stored in a cavity coupled to the support frame.

6. The air jet shield of claim 1, wherein at least one of the plurality of the security straps is configured to attach to a bumper of the passenger vehicle.

7. The air jet shield of claim 1, wherein at least one of the plurality of the security straps is configured to attach to a hood of the passenger vehicle.

8. The air jet shield of claim 1, wherein at least one of the plurality of the security straps is configured to attach to a frame of the passenger vehicle.

9. The air jet shield of claim 1, wherein the region of space within the rotating free air jet and surrounding the passenger vehicle comprises an air deflection perimeter.

10. The air jet shield of claim 1, wherein the reduction in the aerodynamic drag reduces a fuel consumption of the passenger vehicle during travel.

11. A system comprising:
A vehicle; and
an air jet shield coupled to the vehicle, the air jet shield comprising:
    a support frame; and
    a plurality of air ducts coupled to the support frame, the plurality of air ducts comprising a set of V-shaped air ducts horizontally coupled to the support frame and a set of concave air ducts vertically attached to the support frame, each of the air ducts having a decreasing cross-sectional area, wherein each of the air ducts comprises:
        an inlet that receives air from a surrounding environment during a travel of the vehicle into at least one of a headwind and a crosswind; and
        an outlet forming a rectangular shape that dispenses the air received from the inlet as a free air jet, wherein the outlet projects the free air jet into the at least one of the headwind and the crosswind, wherein upon the free air jet entering the at least one of the headwind and the crosswind, a wind shear is created causing the free air jet to rotate at an increased velocity relative to a velocity of the air received from the inlet, wherein a static air pressure and a wind velocity in a region of space within the rotating free air jet and surrounding the vehicle is decreased relative to a static pressure of the air received from the inlet and the wind velocity causing a reduction in aerodynamic drag.

12. The system of claim 11, wherein the region of space within the rotating free air jet and surrounding the vehicle comprises an air deflection perimeter.

13. The system of claim 11, wherein the reduction in the aerodynamic drag reduces a fuel consumption of the vehicle during travel.

14. A headwind and crosswind air jet shield, comprising:
a support frame; and
a plurality of air ducts coupled to the support frame, the plurality of air ducts comprising a set of V-shaped air ducts horizontally coupled to the support frame and a set of concave air ducts vertically attached to the support frame, each of the air ducts having a decreasing cross-sectional area, wherein each of the air ducts comprises:
    an inlet that receives air from at least one of a headwind and a crosswind projected onto at least one of an object and a land area in a surrounding environment; and
    an outlet forming a rectangular shape that dispenses the air received from the inlet as a free air jet, wherein the outlet projects the free air jet into the at least one of the headwind and the crosswind, wherein upon the free air jet entering the at least one of the headwind and the crosswind, a wind shear is created causing the free air jet to rotate at an increased velocity relative to a velocity of the air received from the inlet, wherein a static air pressure and a wind velocity in a region of space within the rotating free air jet and surrounding the at least one of the object and the land area is decreased relative to a static pressure of the air received from the inlet and the wind velocity causing a reduction in aerodynamic drag.

15. The headwind and crosswind air jet shield of claim 14, wherein the support frame comprises a body configured to attach to the object, wherein the object comprises a structure.

16. The headwind and crosswind air jet shield of claim 14, wherein the support frame comprises a body integrated into the object, wherein the object comprises a structure.

17. The headwind and crosswind air jet shield of claim 14, wherein the support frame comprises a body configured to attach to the object, wherein the object comprises a vehicle.

18. The headwind and crosswind air jet shield of claim 14, wherein the support frame comprises a body integrated into the object, wherein the object comprises a vehicle.

19. The headwind and crosswind air jet shield of claim 14, wherein the support frame comprises a body configured to attached to the land area.

20. The headwind and crosswind air jet shield of claim 14, wherein the region of space within the rotating free air jet comprises an air deflection perimeter.

* * * * *